US012018696B2

(12) United States Patent
Loderer et al.

(10) Patent No.: US 12,018,696 B2
(45) Date of Patent: Jun. 25, 2024

(54) SEAL

(71) Applicant: Weir Minerals Europe Limited, Todmorden (GB)

(72) Inventors: Pavol Loderer, Todmorden (GB); Matthew Locke, Todmorden (GB); Paul Clarence, Todmorden (GB); Wilson Bernardo, Jr., Santiago (CL)

(73) Assignee: Weir Minerals Europe Limited

( * ) Notice: Subject to any disclaimer, the term of this patent is extended or adjusted under 35 U.S.C. 154(b) by 231 days.

(21) Appl. No.: 17/625,215

(22) PCT Filed: Jul. 3, 2020

(86) PCT No.: PCT/IB2020/056299
§ 371 (c)(1),
(2) Date: Jan. 6, 2022

(87) PCT Pub. No.: WO2021/005477
PCT Pub. Date: Jan. 14, 2021

(65) Prior Publication Data
US 2022/0275807 A1  Sep. 1, 2022

(30) Foreign Application Priority Data

Jul. 9, 2019 (GB) .................................... 1909807

(51) Int. Cl.
*F04D 29/12* (2006.01)
*F16J 15/3204* (2016.01)
*F16J 15/34* (2006.01)

(52) U.S. Cl.
CPC ........ *F04D 29/126* (2013.01); *F16J 15/3204* (2013.01); *F16J 15/3452* (2013.01)

(58) Field of Classification Search
CPC ................ F16J 15/3204; F16J 15/3452; F04D 29/12–29/128
See application file for complete search history.

(56) References Cited

U.S. PATENT DOCUMENTS

| 3,186,721 A  * | 6/1965 | Petri ..................... F04D 29/588 |
| | | 277/408 |
| 3,467,396 A  * | 9/1969 | Hershey .................. F16J 15/38 |
| | | 277/362 |
| 5,209,497 A | 5/1993 | Von-Bergen et al. |
| 5,553,867 A  * | 9/1996 | Rockwood ............. F16J 15/406 |
| | | 277/432 |
| 6,375,414 B1 * | 4/2002 | Delaney ................... F16J 15/18 |
| | | 415/113 |

(Continued)

FOREIGN PATENT DOCUMENTS

| CN | 201170316 Y | 12/2008 |
| CN | 208138486 U | 11/2018 |

(Continued)

*Primary Examiner* — Sang K Kim
(74) *Attorney, Agent, or Firm* — Morriss O'Bryant Compagni Cannon PLLC.

(57) ABSTRACT

A seal arrangement is described for providing a seal between a rotatable shaft and a housing having a wall through which the shaft extends. The seal arrangement includes, in series, a mechanical seal and a gland seal. The mechanical seal is positioned axially inwardly of the gland seal such that the mechanical seal forms a first stage or primary seal and the gland seal forms a secondary seal.

11 Claims, 2 Drawing Sheets

(56) References Cited

U.S. PATENT DOCUMENTS

Figure 1:
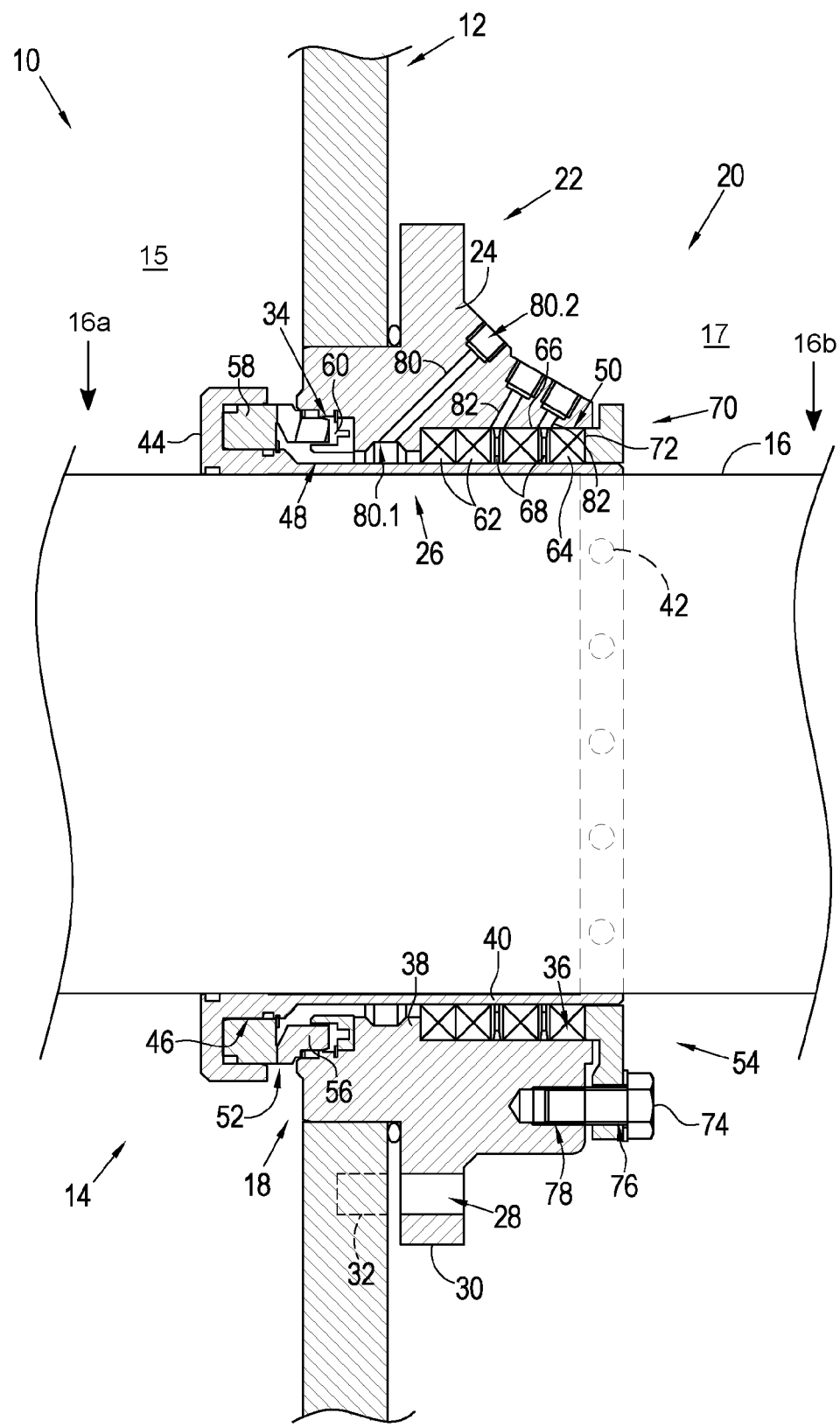

2006/0257245 A1* 11/2006 Smith .................. F04D 29/126
    415/121.2
2015/0069715 A1    3/2015 Parkin et al.

FOREIGN PATENT DOCUMENTS

WO        9849448 A1   11/1998
WO     2008141377 A1   11/2008

* cited by examiner

SEAL

This invention relates to a seal. More particularly, it relates to a seal arrangement for a pump, a pump incorporating such a seal arrangement and to a method of modifying a pump.

In equipment, such as a pump, which includes a housing defining a fluid containing chamber (the wet end of the pump) and a rotating shaft which penetrates the housing and extends from a dry end of the pump to the wet end of the pump, use is made of a seal to inhibit the flow of fluid between the shaft and the housing.

One particular type of pump that requires a seal is a centrifugal pump, particularly a centrifugal pump for pumping slurry (a two phase fluid containing insoluble, abrasive, solid particles). Typical slurries used in mineral processing applications have particle sizes of 1 mm or smaller suspended in a fluid, such as water.

The Inventors are aware of two types of seals which are commonly used in pumps used for mineral processing applications, namely a gland seal and a mechanical seal.

A gland seal typically comprises a stuffing box housing which defines an opening through which the rotating shaft extends such that an annular cavity is defined between a radially inner surface of the stuffing box housing and a surface of the shaft or a protective sleeve which is mounted on the shaft for rotation therewith.

In one type of gland seal, the seal is provided by one or more lip seals that abut against the shaft to prevent or reduce fluid leakage from the pump chamber. One type of lip seal is known as a VR (trade mark) seal, which is typically used for sealing fluids at higher pressures.

In another type of gland seal, packing is positioned in the cavity and is axially compressed to form a seal between the stuffing box housing and the shaft. The packing typically comprises packing material such as polyacrylic fibre impregnated with graphite or PTFE which may be injected with additional lubricant such as grease.

An advantage of a gland seal is that it is relatively simple in construction. However, as the packing material wears it is prone to fluid leakage from the pump chamber. When used in mineral processing applications this is undesirable; particularly because water may be expensive where the pump is operated in arid conditions.

The primary components of a mechanical seal include an annular fixed seal element and an annular rotating seal element which is secured to the shaft for rotation therewith. The seal elements define oppositely disposed sealing faces which are urged towards one another to form a fluid seal therebetween.

An advantage of a mechanical seal is that during normal operation there is no leakage through the seal.

A disadvantage of a mechanical seal is that it is relatively expensive. In addition, there is a limitation regarding the pressure differential across the seal. This problem is addressed by providing an arrangement which includes two mechanical seals adjacent to one another, and providing pressurised fluid therebetween, to limit the pressure differential across each seal to within acceptable limits. However, it will be appreciated that this significantly increases the costs associated therewith.

In order to form the seal, the sealing faces of the seal elements are machined to a high degree of tolerance and surface finish. In harsh environments, such as slurry pumps, where the pumped fluid can be highly abrasive and the components of the pump, including the seal components, are subjected to high loading, e.g. when starting the pump, a failure of a mechanical seal tends to be catastrophic necessitating the operation of the pump to be halted immediately until the seal can be repaired or replaced. In mineral processing applications this may require the entire mill circuit to be halted until the seal is replaced, which is very expensive.

It is an object of this invention to provide means which the Inventors believe will at least ameliorate one or more of these problems or other problems of prior art seals, or will provide a useful alternative.

Accordingly, there is provided a seal arrangement for providing a seal between a rotatable shaft and a housing having a wall through which the shaft extends, the seal arrangement including in series a mechanical seal and a gland seal.

The seal arrangement may include a seal body comprising an annular outer element which is connected or connectable to the housing and an annular inner element which is connected or connectable to the shaft for rotation therewith, the mechanical seal includes a fixed seal element which is secured to the outer element of the seal housing and a rotating seal element which is fixed to the inner element of the seal housing and a biasing arrangement urging complementary sealing faces of the fixed seal element and the rotating seal element into contact with one another.

According to a first aspect there is provided a seal arrangement for a pump to provide a seal between a rotatable shaft and a housing having a wall through which the shaft extends, the seal arrangement comprising: a seal body having a fixed outer element and a rotatable inner element coupled to the rotatable shaft, the fixed outer element including a fixed annular seal component, and the rotatable inner element including a rotatable annular seal component in close-coupled relation to the fixed annular seal component to form a mechanical seal, the seal body defining a barrier liquid cavity, a gland seal cavity, and a pressurised liquid feed passage extending through the seal body and having an inner end in fluid communication with the barrier liquid cavity, and an outer end opening out of the outer element and being connectable in flow communication with a pressurised liquid supply to inject high pressure barrier liquid to reduce the pressure gradient across the mechanical seal; and a gland seal located in the gland seal cavity.

The pressurised liquid feed passage may open into the barrier liquid cavity or into a space adjacent the barrier liquid cavity (e.g. between the barrier liquid cavity and the gland seal cavity).

The barrier liquid cavity may be provided on a dry side of the mechanical seal.

The barrier liquid cavity may function as a pressurised cavity.

A biasing arrangement (such as a spring) may be mounted in the annular outer element for urging complementary sealing faces of the rotatable annular seal component and the fixed annular seal component together.

The mechanical seal may be positioned on a wet side of the seal arrangement i.e. axially inwardly of the gland seal where fluid is being pumped. Hence, the mechanical seal will form the first stage or primary seal to inhibit leakage between the shaft and the housing and the gland seal will (during normal operation) form a secondary seal.

The advantage with this arrangement is that the mechanical seal will prevent any leakage of the fluid, however, should the mechanical seal fail, the gland seal, which forms a secondary seal, will permit the equipment to continue operating permitting the mechanical seal to be repaired or replaced at a convenient time, e.g. at the next maintenance shutdown of the equipment.

A radially inner surface of the outer element and a radially outer surface of the inner element may, at least partly, define between them the barrier liquid cavity within which at least part of the mechanical seal is positioned and the gland seal cavity which is spaced axially from the barrier liquid cavity and within which at least part of the gland seal is positioned.

The fixed seal component may be positioned, at least partially, in the barrier liquid cavity, the inner element of the seal housing including an annular sleeve which is mounted around and secured to the shaft and a flange protruding from an axially inner end of the sleeve, the flange having an annular recess therein which opens axially towards the barrier liquid cavity and within which at least part of the rotatable annular seal component is located.

The gland seal cavity may open out of the seal body in an axially outward direction and packing may be provided in the gland seal cavity. The packing may include at least two axially spaced annular packing rings. A lantern ring may be provided between adjacent packing rings. Alternatively, or additionally, at least one lip seal may be positioned in the gland seal cavity.

The seal arrangement may include a compression member which includes an annular axially extending protrusion which extends into the axially outer end of the gland seal cavity to compress the packing of the gland seal, the compression member being secured to the fixed outer element of the seal body by fasteners which permit the axial position of the compression member, and hence the compression of the packing, to be adjusted.

The pressurised liquid feed passage may extend through the outer element of the seal body and may have an inner end which opens into an annular space between the barrier liquid and gland seal cavities and an outer end which opens out of the outer element and is connected or is connectable in flow communication with a high pressure liquid (e.g. water) supply. This high pressure liquid supply enables a smooth pressure gradient from the wet end of the pump to the dry end of the pump, thereby improving the effectiveness of the mechanical seal.

A grease feed line may extend from an outer surface of the outer element of the seal body to the gland seal cavity to permit lubricant (such as grease) to be fed into the gland seal.

The barrier liquid cavity (pressurised cavity) may be maintained at a pressure in the range from 0.3 MPa to 0.8 MPa.

The wet end of the pump may operate at a pressure in the range from 0.9 MPa to 1.2 MPa.

The dry end of the pump may operate at atmospheric pressure, that is, approximately, 0.1 MPa.

By providing a pressurised barrier liquid cavity, the pressure difference across the mechanical seal can be maintained at below 0.5 MPa, and the pressure differential across the gland seal can also be maintained at below 0.5 MPa; thereby reducing the risk of premature failure of each of the seals.

To maintain a pressurised barrier liquid cavity, the gland seal must operate as a functioning seal when the mechanical seal is operating, it cannot be used merely as a back-up seal that is only activated in the event of failure of the mechanical seal.

According to a second aspect of the invention, there is provided a seal arrangement for providing a seal between a rotatable shaft and a housing having a wall through which the shaft extends, the seal arrangement including a seal body comprising an annular outer element which is connected or connectable to the housing and an annular inner element which is connected or connectable to the shaft for rotation therewith, a fixed seal element which is secured to the outer element of the seal housing and a rotating seal element which is fixed to the inner element of the seal housing and a biasing arrangement urging complementary sealing faces of the fixed seal element and the rotating seal element into contact with one another to form a first seal, packing which is positioned between the outer element and the inner element to form a second seal, and a pressurised fluid feed passage extending through the seal body and having an inner end in fluid communication with the first seal, and an outer end opening out of the outer element and being connectable in flow communication with a pressurised fluid supply to inject high pressure fluid to reduce the pressure gradient across the first seal.

The high pressure fluid may be a liquid. One suitable liquid is water, but other liquids may be used.

According to a third aspect of the invention, there is provided a pump which includes: a housing defining a pumping chamber; an impeller mounted for rotation within the pumping chamber; a drive shaft which is drivingly connected to the impeller and which extends through an aperture in a wall of the housing; and a seal arrangement of the type described above which provides a fluid seal between the housing and the drive shaft.

The pump may be a slurry pump.

According to a fourth aspect of the invention, there is provided a method of modifying a pump which includes a housing defining a pumping chamber, an impeller mounted for rotation within the pumping chamber, a drive shaft which is drivingly connected to the impeller and which extends through an aperture in a wall of the housing and a seal which provides a fluid seal between the housing and the drive shaft, which method includes replacing the seal with a seal arrangement of the type described above.

According to a fifth aspect of the invention, there is provided a fall-back seal arrangement for providing a seal between a rotatable shaft and a housing having a wall through which the shaft extends, the seal arrangement including in series a mechanical seal acting ordinarily as a primary seal, and a gland seal acting ordinarily as a secondary seal, whereby in the event of failure of the primary seal, the seal arrangement continues in operation with the gland seal operating as the primary seal.

According to a sixth aspect there is provided a seal arrangement for a pump to provide a seal between a rotatable shaft and a housing having a wall through which the shaft extends, the seal arrangement comprising: a seal body having a fixed outer element and a rotatable inner element coupled to the rotatable shaft, the fixed outer element including a fixed annular seal component, and the rotatable inner element including a rotatable annular seal component in close-coupled relation to the fixed annular seal component to form a mechanical seal, the seal body defining a barrier liquid cavity inside the mechanical seal, and a gland seal located in a gland seal cavity, and a pressurised liquid feed passage extending through the seal body and opening into the barrier liquid cavity, and an outer end opening out of the outer element and being connectable in flow communication with a pressurised liquid supply to inject high pressure barrier liquid to reduce the pressure gradient across the mechanical seal.

According to a seventh aspect there is provided a seal arrangement for a pump to provide a seal between a rotatable shaft and a housing having a wall through which the shaft extends, the seal arrangement including, in series, a mechanical seal and a gland seal, and having a seal body comprising a fixed annular outer element and a rotatable annular inner element coupled to the rotatable shaft, the fixed outer element including at least one high pressure liquid feed passage extending therethrough, the liquid feed passage having an inner end in fluid communication with a barrier liquid cavity, and an outer end which opens out of the outer element and is connectable in flow communication with a high pressure liquid supply to inject high pressure barrier liquid to reduce the pressure gradient across the mechanical seal.

This arrangement allows the high pressure liquid supply to be injected into the barrier liquid cavity.

The seal arrangement may include a gland seal cavity.

The liquid feed passage inner end may open into an annular space between the barrier liquid cavity and a gland seal cavity.

Any feature of one of the above aspects may be combined with another of the above aspects to create further aspects.

Figure 2:
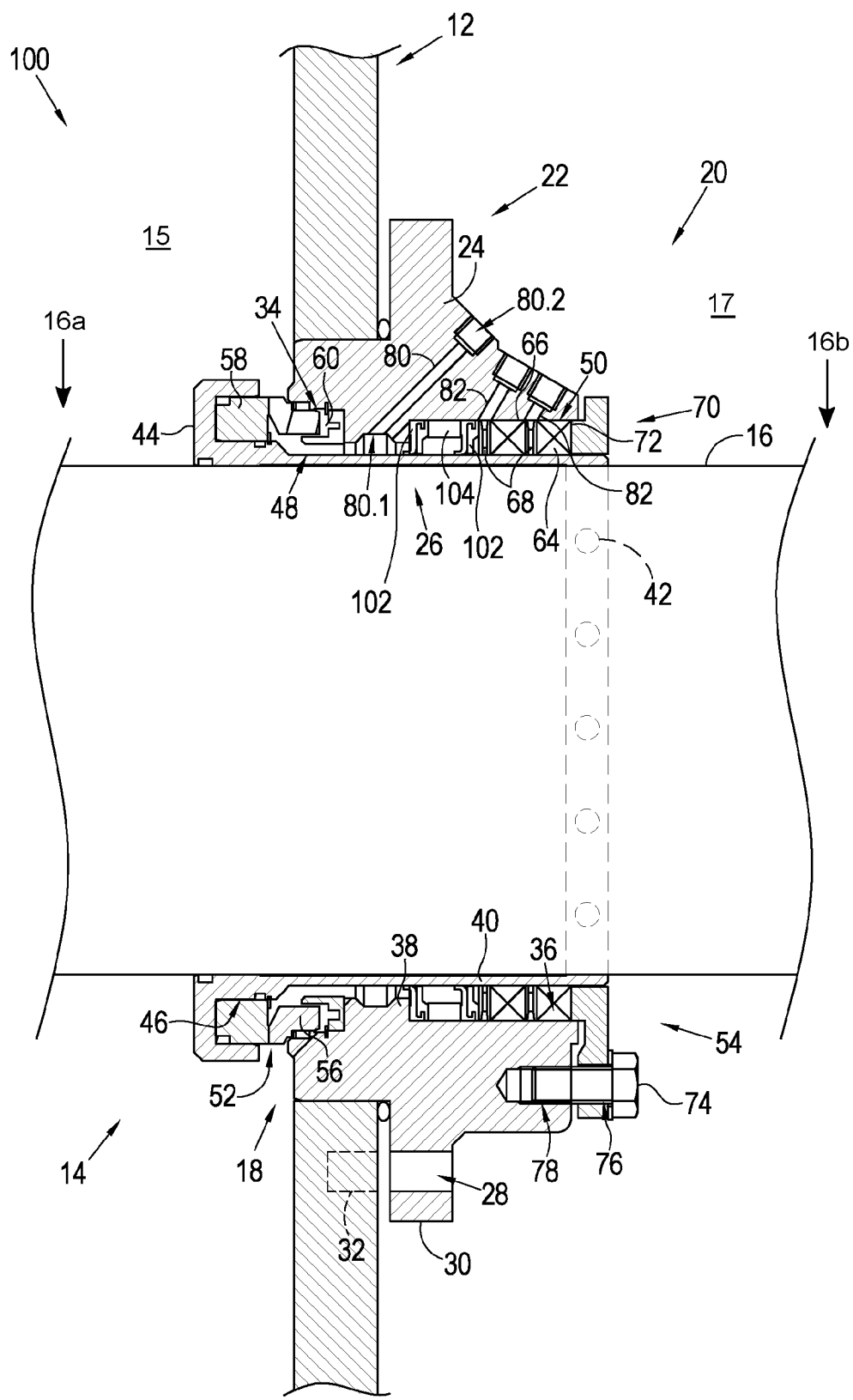

These and other aspects of the invention will now be described, by way of example, with reference to the accompanying diagrammatic drawings, in which:

FIG. 1 shows a simplified sectional view of part of a pump in accordance with one embodiment of the invention; and FIG. 2 shows a simplified sectional view, similar to FIG. 1, of a pump in accordance with another embodiment of the invention.

DETAILED DESCRIPTION OF EXAMPLE EMBODIMENTS

The following description is provided as an enabling teaching. Those skilled in the relevant art will recognise that many changes can be made to the embodiments described, while still attaining the beneficial results of the present invention. It will also be apparent that some of the desired benefits can be attained by selecting some of the features of the following embodiments without utilising other features. Accordingly, those skilled in the art will recognise that modifications and adaptations to the described embodiments are possible and can even be desirable in certain circumstances, and are a part of the present disclosure. Thus, the following description is provided as illustrative of the principles of the present invention and not a limitation thereof.

In FIG. 1 of the drawings, reference numeral 10 refers generally to a pump in accordance with an embodiment of the invention. The pump 10 is designed for pumping highly abrasive slurry, for example, in a mining or mineral processing environment. In this embodiment, the pump 10 is suitable for pumping a liquid having solids suspended therein in the size range from approximately 100 microns to 1 mm (which is one example of a typical mining slurry). The pump 10 includes a housing or casing 12, part of which is shown in FIG. 1 of the drawings, defining a pumping chamber 14 within which an impeller (not shown) is mounted for rotation. The area inside the pumping chamber 14 may be referred to as the wet end 15 of the pump 10. A drive shaft 16 extends through an aperture 18 in a wall of the housing 12 and has an inner end 16a which is drivingly connected to the impeller and an outer end 16b which is positioned outside the housing 12 and is connected or connectable to a power source such as an electric motor. The outer end 16b is located at the dry end 17 of the pump 10. The pump 10 further includes a seal arrangement in accordance with the invention, generally indicated by reference numeral 20, to provide a fluid seal between the housing 12 and drive shaft 16 as described in more detail herebelow.

The seal arrangement 20 includes a seal body generally indicated by reference numeral 22 which comprises an annular outer element 24 and an annular inner element 26. The annular inner element 26 is fixed to the shaft 16 for rotation therewith.

The outer element 24 is secured to the housing 12 by means of circumferentially spaced bolts extending through circumferentially spaced holes 28 in an annular flange 30 of the outer element 24 and into screw-threaded engagement with complementary holes 32 defined by the housing 12.

An annular rebate (mechanical seal rebate) 34 is provided in a radially inner surface of the outer element 24 and extends longitudinally inwardly from an operatively inner end, i.e. the end facing into the pumping chamber 14, of the outer element 24 for part of the length of the outer element 24.

An annular rebate (gland seal rebate) 36 is provided in the radially inner surface of the outer element 24 and extends longitudinally inwardly into the outer element 24 from an operatively outer end thereof, i.e. the end facing away from the pumping chamber 14, for part of its length such that axially inner ends of the rebates 34, 36 are spaced-apart by an annular radially inwardly directed shoulder 38.

The inner element 26 includes an annular sleeve (shaft sleeve) 40 which is positioned around the drive shaft 16 and secured in position by locking screws 42 extending through circumferentially spaced holes in the shaft sleeve 40 and into abutment with the drive shaft 16.

The inner element 26 defines a flange 44 that protrudes from an axially inner end (wet end 15) of the shaft sleeve 40 and defines an annular recess 46 therein which opens axially outwardly, i.e. towards the operatively inner end of the outer element 24.

The radially inner surface of the outer element 24 formed by the rebate 34 and the adjacent radially outer surface of the shaft sleeve 40 define between them a first annular cavity (barrier liquid cavity) 48 which opens axially inwardly, i.e. towards the recess 46. A radially inner surface of the outer element 24 formed by the rebate 36 and the adjacent radially outer surface of the shaft sleeve 40 together form a second annular cavity (gland seal cavity) 50 which opens axially outwardly of an operatively outer end of the seal body 24.

The seal arrangement 20 includes a fixed seal annulus (or component) 56 which is secured to the outer element 24 in the barrier liquid cavity 48 such that it protrudes axially therefrom. A rotating (or rotatable) seal annulus (or component) 58 is secured in the recess 46 of the flange 44 such that it rotates together with the drive shaft 16. The rotating seal annulus 58 protrudes axially outwardly from the recess 46. The seal components 56, 58 define oppositely disposed sealing faces and the fixed seal component 56 is urged axially towards the rotating seal component 58 by a spring arrangement 60 to form a mechanical seal, generally indicated by reference numeral 52.

The seal arrangement 20 further includes two inner packing rings 62 (nearest the wet end 15), an outer packing ring 64 (nearest the dry end 17) and an intermediate packing ring 66. A lantern ring 68 is positioned between the outer packing ring 64 and the intermediate packing ring 66 and between the intermediate packing ring 66 and the axially outermost (nearest the wet end 15) inner packing ring 62.

The seal arrangement further includes a compression ring, generally indicated by reference numeral 70. The compression ring 70 includes an annular axially extending protrusion 72 which extends into the gland seal cavity 50 through the axially outer end thereof to compress the packing rings 62, 64, 66 to form a gland seal, generally indicated by reference numeral 54. The compression ring 70 is connected to the outer element 24 of the seal body 22 by bolts 74 extending through circumferentially spaced holes 76 in the compression ring 70 into screw-threaded engagement with complementary holes 78 in the outer element 24. By tightening the bolts 74, the compression ring 70 urges the packing rings 62, 64, 66 against the shoulder 38, thereby compressing the packing rings 62, 64, 66.

A high pressure liquid feed passage 80 (water is used as the high pressure liquid in this embodiment) extends through the outer element 24 and has an inner end 80.1 which opens into the barrier liquid cavity 48. The high pressure water feed passage 80 has an outer end 80.2 which opens out of a radially outer surface of the outer element 24 and is connected or connectable in flow communication with a high pressure water supply. The high pressure water supply serves as a lubricant for the mechanical seal 52, and also provides coolant for the seal arrangement, and balances pressure between the fixed part (the fixed seal annulus 56) and the rotating part (the rotating seal annulus 58) of the mechanical seal 52. The high pressure water supply ensures that the pressure of the barrier liquid is typically between 3 to 10 bar (0.3 to 1 MPa). In one pump, the pressure at the wet end 15 of the pump may be in the region of 11 bar (1.1 MPa), the barrier liquid pressure may be 6 Bar (0.6 MPa), and the dry end 17 of the pump is at 1 bar (0.1 MPa), atmospheric pressure. This means that the pressure differential across the mechanical seal 52 is 5 bar (0.5 MPa).

A grease feedline 82 extends from an outer surface of the outer element 24 into the gland seal cavity 50 at a position in registration with each lantern ring 68 to permit lubricant to be fed into the gland seal 54 as required.

Reference is now made to FIG. 2 of the drawings, in which reference numeral 100 refers generally to a pump in accordance with another embodiment of the invention, and, unless otherwise indicated, the same reference numerals used above are used to designate similar parts. The main difference between the pump 10 and the pump 100 is in the configuration of the gland seal 54. In particular, in the pump 100, the inner packing rings 62 are replaced with a pair of lip seals 102 which are spaced apart axially by a lip seal spacer 104.

In use, the mechanical seal 52 of the pump 10, 100, forms the primary seal to inhibit the flow of fluid from the pumping chamber 14 through the aperture 18. The gland seal 54 provides a secondary seal that allows the barrier liquid to be pressurised to reduce the pressure gradient in the seal arrangement 20. Furthermore, if, however, the mechanical seal 52 should fail, the gland seal 54 forms a back-up primary seal which permits the pump 10, 100 to continue to operate until it is convenient to shut the pump down in order to repair or replace the mechanical seal 52.

The Inventors believe that the invention will provide the advantages associated with a mechanical seal, i.e. zero leakage and at the same time obviate the major disadvantage of a mechanical seal, namely, that should it fail, the failure is catastrophic necessitating an immediate shutdown of the pump 10, 100.

The invention claimed is:

1. A pump including a seal arrangement to provide a seal between a rotatable shaft and a housing having a wall through which the shaft extends, the seal arrangement comprising:

a seal body having a fixed outer element and a rotatable inner element coupled to the rotatable shaft, the fixed outer element including a fixed annular seal component, and the rotatable inner element including a rotatable annular seal component in close-coupled relation to the fixed annular seal component to form a mechanical seal, the seal body defining a barrier liquid cavity, a gland seal cavity, and a pressurised liquid feed passage extending through the seal body and having an inner end in fluid communication with the barrier liquid cavity, and an outer end opening out of the outer element and being connectable in flow communication with a pressurised liquid supply to inject high pressure barrier liquid to reduce the pressure gradient across the mechanical seal; and a spring arrangement mounted in the outer element and urging complementary sealing faces of the rotatable annular seal component and the fixed annular seal component into contact with one another; and a gland seal located in the gland seal cavity;

wherein the mechanical seal is positioned axially inwardly of the gland seal such that the mechanical seal forms a first stage or primary seal and the gland seal forms a secondary seal.

2. A pump according to claim 1, wherein the pressurised liquid feed passage opens into a cavity between the barrier liquid cavity and the gland seal cavity.

3. A pump as claimed in claim 2, in which the fixed seal component is positioned, at least partially, in the barrier liquid cavity, the rotatable inner element including an annular sleeve which is mounted around and secured to the shaft and a flange protruding from an axially inner end of the sleeve, the flange having an annular recess therein which opens axially towards the barrier liquid cavity and within which at least part of the rotating seal element is located.

4. A pump as claimed in claim 1, in which the gland seal cavity opens out of the seal body in an axially outward direction and packing is provided in the gland seal cavity.

5. A pump as claimed in claim 4, in which the packing includes at least two axially spaced annular packing rings.

6. A pump as claimed in claim 5, in which a lantern ring is provided between adjacent packing rings.

7. A pump as claimed in claim 1, in which at least one lip seal is positioned in the gland seal cavity.

8. A pump as claimed in claim 4, which includes a compression ring including an annular axially extending protrusion which extends into the axially outer end of the gland seal cavity to compress the packing of the gland seal, the compression ring being secured to the annular outer element of the seal body by fasteners which permit the axial position of the compression ring to be adjusted.

9. A pump as claimed in claim 1, which includes a grease feedline extending from an outer surface of the outer element of the seal body to the gland seal cavity to permit lubricant to be fed into the gland seal.

10. A pump as claimed in claim 1, which is a slurry pump.

11. A method of modifying a pump which includes a housing defining a pumping chamber, an impeller mounted for rotation within the pumping chamber, a drive shaft which is drivingly connected to the impeller and which extends through an aperture in the wall of the housing and a seal which provides a fluid seal between the housing and the drive shaft, which method includes replacing the seal with a seal arrangement to provide a pump as claimed in claim 1.

* * * * *